Sept. 16, 1969      KANJI OTANI      3,467,743

APPARATUS FOR THE EXTRUSION OF PLASTICS

Filed Jan. 9, 1967

INVENTOR.
KANJI OTANI
BY CAROTHERS & CAROTHERS
HIS ATTORNEYS

3,467,743
APPARATUS FOR THE EXTRUSION OF PLASTICS
Kanji Otani, 473 Kanagawa Prefecture, Kamakura, Japan
Filed Jan. 9, 1967, Ser. No. 608,212
Claims priority, application Japan, Jan. 11, 1966,
41/1,627
Int. Cl. B28b *3/20;* B29f *1/08, 3/00*
U.S. Cl. 264—176                                     6 Claims

ABSTRACT OF THE DISCLOSURE

An extruder for high speed extrusion of plastics having two transversely connected extruder stages, the first stage for receiving the plastic material for plastication and feeding the same at its extruding outlet to the transversely feeding zone of the second stage extruder whereupon the molten material is high speed metered to a die at the extruding outlet of the second stage extruder. A synchronous device is used to synchronize the operation of the extruder screws of the first and second stage extruders so that the respective rotational feed of the first and second stage extruder screw are synchronized to the extent that the speed of the second stage extruder is in excess of that ordinarily necessary to supply this stage with a constant and uninterrupted capacity flow of molten plasticated materials so that a resultant high shear stress is improved upon plasticated materials present in the second stage extruder.

BACKGROUND OF THE INVENTION

This invention relates generally to improvements in extruders used in the extrusion of plastics wherein a screw is used as the driving force.

At the present time development with respect to the under-mentioned three requirements are strongly desired for the apparatus for the extrusion of plastics, especially in connection with the extrusion of polyvinyl chloride.

(1) To eliminate bubbles or voids that occur in the extrudate due to entrapped air, moisture, volatile gases, etc., in order to obtain satisfactory products.

(2) To achieve better homogeneous mixing in order to obtain satisfactory products.

(3) To run extruders at high screw speeds in order to obtain an increase in output.

With respect to (1) above, several types of vented extruders have been devised in which the screw has the vent section where the volatiles and other gaseous components are released from the melt. It is, however, difficult to use this type of the apparatus for a material like polyvinyl chloride which readily becomes affected by overheating because there takes place the vent-up of the extruded material.

With respect to the requirement (2) for a complete homogenization and plastification, it is necessary to maintain the plastic material for an adequate enough time in the extruder screw by increasing the L/D ratio. However, it is expensive to manufacture a screw with a large L/D. Furthermore, the whole apparatus will then be large taking up a lot of room and highly expensive with large power requirements.

With respect to requirement (3) for speed-up, an increase in the number of revolutions of the screw results in better mixing of the plastic material and is desirable for producing a high quality product, since a high shear rate is brought about by high speed operation. In addition, the output of the extrudate increases approximately in proportion to the number of revolutions of the screw, so that an increase in the output of the extrudate may be obtained with an extruder with the same screw diameter. When the screw is revolved at a high speed, however, over-heating in the extruder is apt to take place owing to the extreme high shear rate between the screw and the cylinder barrel. The fact that it is difficult to effect sufficient cooling of this part is a large bottleneck for the development of a high speed extrusion. This is especially true in the case of materials like polyvinyl chloride which are apt to deteriorate through over-heating. It is impossible to increase the speed, which, at the present time, is about 80 r.p.m. in the case of 4½" extruder at best suitable maximum speed.

SUMMARY

The principal object of the present invention is the provision of an extruder which makes it possible to speed up the extrusion without affecting the quality of the extrudate wherein there is provided a first stage screw device having a supply hopper and a second stage screw device provided with an extruder crosshead at one end which are placed crosswise together or in transverse relationship so that the extruding outlet of the first device is connected directly to the feed zone (not the pressure zone) of the second stage screw device.

Another object comprising this invention is the method of producing an extrudate at high speed without affecting the quality of the extrudate by providing two separate extruder stages with the extruding output of the first connected transversely to that of the feed zone of the second. The plastic material is then fed into the hopper supply of the first extruder stage where the same is plasticated into its molten state with the aid from the application of a heating device and thereafter fed to the aforementioned feed zone of the second extruder stage. The second extruder stage is operated at a higher rate of speed as compared to the first extruder stage in order to concurrently increase the shear rate of the molten plasticated material in the second extruder stage while at the same time conveying the same at a high speed rate to the die or crosshead. In order to provide a high speed continuously produced extrudate, the operation of the separate extruder stages is synchronized by synchronizing the driving motors.

Other objects and advantages of this invention appear hereinafter in the following description and claims.

The accompanying drawings show, for the purpose of exemplification without limiting the invention or claims thereto, certain practical embodiments illustrating the principles of this invention wherein:

Figure 1:
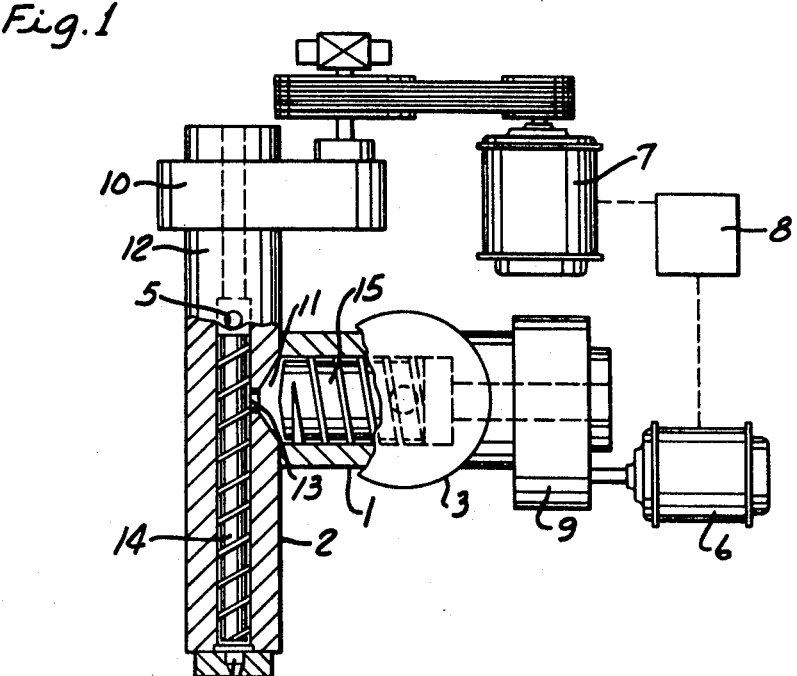
FIG. 1 is a plan view, with parts in section, showing the extruder comprising this invention.

Referring to FIG. 1, the first stage screw device or extruder 1, which is the feed section, and the second stage screw device or extruder 2, which is metering section, are positioned transversely relative to one another. The first stage screw device 1 is provided with a hopper 3 to receive the material to be extruded and is driven by the first stage motor 6 via the first reducer 9. The second stage screw device or extruder 2 is positioned in a transverse direction relative to the first stage screw device 1 in such a way that the extruding outlet 11 of the first stage screw device 1 is connected directly to the feed zone 13 of the second stage screw 14 and is provided at one end with the usual die or crosshead 4. The second stage screw 2 has a venting device 5 at the opposite end 12 relative to the crosshead 4. The second stage screw device 2 is driven by the second motor 7 via the second reducer 10. A synchronizing control device 8 is provided to control the speed relationship of the first and the second motors 6 and 7.

The synchronizing control device 8 may be a motor speed control to maintain a constant speed ratio between motors 6 and 7 and is initially varied until there is cooperative relation between the operation of the first and second stages screws 1 and 2 so that there is a continuous flow of molten plasticated material from the outlet 11 into the feed zone of the second stage extruder 2. Thus the speed control is set in accordance with the pressure flow of material at the outlet 11 so that the same is not intermittent or interrupted in view of the slowness or fastness of the operation of the second stage screw 14.

Operation and use of apparatus shown in FIG. 1 is as follows. The material to be extruded is supplied to the first stage screw device 1 from the hopper 3. The first stage screw device has a larger diameter and revolves at lower speed than that of the second stage screw. The speed of the first stage screw device does not exceed 100 r.p.m. The plastic material to be extruded which has been supplied to the screw device 1 is heated by a heating device surrounding the first stage screw device. As the plastic material is permitted to remain in the first stage screw device, its temperature will become high enough to effect its plastification into a homogeneous melt. Then this plasticated material is supplied to the feed zone 13 of the second stage screw device 2 through the extruding outlet 11.

When the molten flow of the material moves from the first stage screw device 1 to the second stage screw device 2, the air, moisture, volatile matters, etc., in the plastic material are suddenly subjected to a lower pressure at the outlet 11 of the first stage screw device due to the high speed operation of the second stage extruder 2 and form bubbles or voids which are then removed by means of the vent device 5 connected to a vacuum pump (not shown). At this time the molten material does not flow towards the vent device 5 but is pushed and forced on to the usual die or crosshead 4 by means of the screw 14.

The second stage screw 14 has a smaller diameter than the screw 15 of the first stage screw device 1 and thus have different size channel areas. However, extrudate quantity of both channel areas is equal. In order to effect continuous extrusion with harmonious cooperative operation of the first and second stage screw devices together with the quantity and rate of the material being supplied from the first stage screw device 1, it is necessary for the second stage screw 2 to run at a higher speed than the first stage screw 1. As a consequence, the plastic material to be extruded is subjected to a higher shear rate and thus is given a better mix. The second stage screw device is in a heated condition at the beginning of the operation. When it is operated at a high speed, it is necessary to operate the second stage screw 14 in an adiabatic condition or even to cool it to prevent overheating due to high shear rate imposed upon the plastic material. The first and second stage screw devices are separately constructed and can easily be thermally insulated with a heat insulator placed between them. It is therefore easy to separately control the operating temperatures of these screw devices.

The first and second motors are made to run at a constant ratio by means of the synchronizing control 8. Needless to say, however, the two screw devices may be driven by one motor via some power transmission devices.

Figure 2:
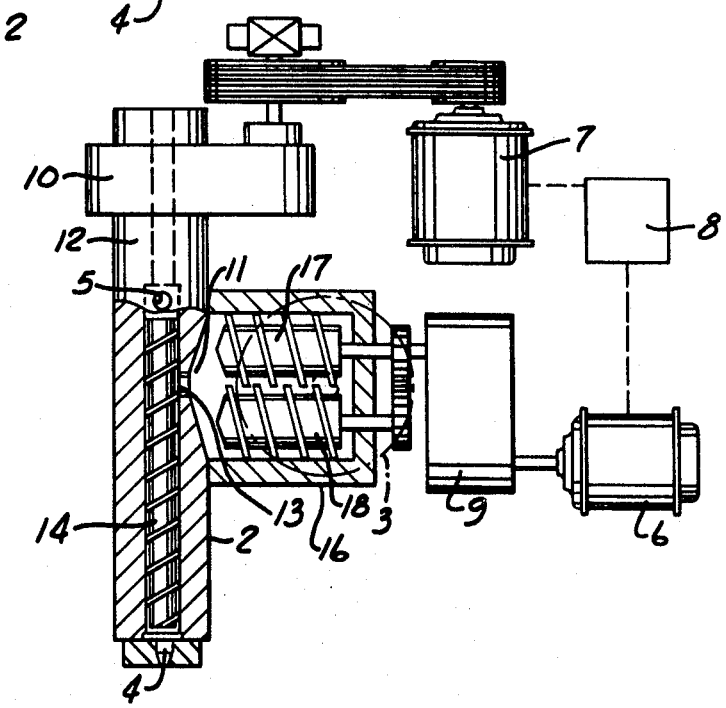
FIG. 2 is a plan view, with parts in section, of the extruder of FIG. 1 with a modification thereto.

In FIG. 2, the first screwing device 1 of FIG. 1 has been replaced by the screw device 16 using two screws 17 and 18 which are placed in parallel relation.

The following table illustrates an actual test comparison of the characteristics of the extruder comprising the features of the present invention with those of the conventional single screw extruder.

|  | Extruder of the Present Invention—90φ Extruder | Conventional Single Screw Extruder | |
|---|---|---|---|
|  |  | 115φ Extruder | 200φ Extruder |
| Screw Diameter (mm.) | First stage, 200 | 115 | 200 |
|  | Second stage, 90 |  |  |
| Screw Length (mm.) | First stage, 600 | 2,286 | 3,110 |
|  | Second stage, 800 |  |  |
| Number of Revolutions (r.p.m.) | First stage, 30~80 | 50~80 | 40~60 |
|  | Second stage, 150~250 |  |  |
| Output (kg./m.) | 250~350 | 160~200 | 350~500 |
| Length of the Machine (mm.) | 1,800 | 3,780 | 5,295 |
| Weight of the Machine (kg.) | 3,800 | 5,010 | 13,125 |
| Driving motor (kw.) | First stage, 22 | 75 | 150 |
|  | Second stage, 50 |  |  |

As shown in the above table, the second stage screw device operates at a higher speed, so that it extrudes a larger quantity than the extruder of the conventional type where the diameters of both screws are equal. In fact, the output of the second stage screw will be about equal to an extruder of the conventional type having the same diameter as the first screw device 1 of the apparatus comprising this invention.

Also, it should be carefully noted that there is a considerable reduction in length and weight of the machine comprising this invention and also a reduction in screw length and diameter as compared with the conventional single screw extruder. This permits a reduced cost advantage.

The extruder comprising the present invention provides the following advantages. First, it produces an improved overall mixing of the plastic material and thus a better density of material to work. With the conventional single screw extruder, it has been difficult to bring about a good mixing without increasing the $L/D$ ratio. In the case of the extruder of the present invention, the material stays in the first stage screw device sufficient time to be mixed and the high speed revolution of the second stage screw device effects complete thorough mixing. Secondly, high extrusion speeds are possible. If the temperature of the plastic material is high enough in the first stage screw device, it is only necessary for the second stage screw device to carry out the final mixing through the high shear rate obtainable. Thus it is possible for the second stage screw device to run at a very high speed to effect a high speed extrusion.

Furthermore, the second screw need not be very long in length because of the sufficient time permitted for the plastic material to remain in the first stage, so that the mass of this second stage is small and consequently has a smaller heat inertia, which provides easier temperature control and enables satisfactory and easier cooling to be effected. Thus high speed extrusion without overheating is possible.

Third, the cost of the extruder machinery is not as high as the conventional single screw extruder. The fact that the second stage screw is shorter results in a big reduction in the manufacturing cost. In view of this and also in view of the fact that a smaller second stage reducer is sufficient for the higher speed revolution, the addition of a first stage screw device does not mean any increase in the total cost of the machinery employed to carry out the invention.

I claim:

1. Apparatus for improving the homogeneous melt, mix and increasing the resultant density of plastic materials to be extruded without affecting the qualities of the extrudate due to overheating comprising a first stage large diameter screw extruder provided with a material supply hopper, first motor means to drive said first stage screw, a second stage small diameter screw extruder having an outlet connected to a die, second motor means to drive said second stage screw, an outlet from said first stage extruder connected in transverse relation to the feed zone of said second stage extruder, and control means to synchronize the respective rotational speeds of said first and second stage screws to the extent that the speed of said second stage extruder is in excess of that necessary to supply said second stage extruder with a constant and uninterrupted capacity flow of molten plasticated materials to impose upon such materials in said second stage extruder a high shear stress.

2. The apparatus of claim 1 characterized in that the speed of said second stage extruder is at least three times in excess of that of said first stage extruder.

3. Apparatus for improving the homogeneous melt, mix and resultant density of plastic materials to be extruded, such as, polyvinyl chloride, without affecting the qualities of the extrudate due to overheating comprising a heated first stage extruder with a large diameter screw providing a channel area for passage of said materials, an inlet to said first stage extruder having a material supply hopper connected thereto, first motor means to drive said first stage screw, an adiabatically maintained second stage extruder with a screw having a diameter smaller than said first stage screw and having a channel area equal in volume to the channel area of said first stage extruder, second motor means to drive said second stage screw, an outlet from said second stage extruder to supply said materials to a die, an outlet from said first stage extruder connected in transverse relation to the feed zone of said second stage extruder, control means to synchronize the respective rotational speeds of said first and second stage screws to the extent that the speed of said second stage extruder is in excess of that necessary to supply said second stage extruder with a constant and uninterrupted capacity flow of molten plasticated materials to impose upon such materials in said second stage extruder a high shear stress.

4. A process for increasing the output of a plastic material extrudate while improving the homogeneous melt, mix and resultant density of the extrudate without affecting the quality of the extrudate due to overheating in a two stage extruder wherein the first stage has an independently operated large diameter screw and the second stage has an independently operated small diameter screw comprising the step of driving the second stage screw at a faster rate of rotational speed as compared to that of the first stage screw in a manner excess of that speed necessary to supply from the first stage to the second stage a constant and uninterrupted capacity flow of molten plasticated material thereby imposing upon the molten plasticated material in the second stage a high shear stress.

5. The process of claim 4 characterized by the step of maintaining the temperature of the second stage extruder in an adiabatic condition.

6. The process of claim 4 characterized by driving the second stage screw at a rotational speed of at least three times as compared to that of the first stage screw.

References Cited

UNITED STATES PATENTS

| 2,556,391 | 6/1951 | Hawks. |
| 3,148,231 | 9/1964 | Spencer. |
| 3,261,056 | 7/1966 | Fritsch. |
| 3,285,200 | 11/1966 | Slaybaugh et al. |

FOREIGN PATENTS

| 1,151,815 | 2/1958 | France. |

WILLIAM J. STEPHENSON, Primary Examiner

U.S. Cl. X.R.

264—329; 18—12